W. J. TINKER.
GAS FILTER.
APPLICATION FILED APR. 15, 1911.
1,020,782.
Patented Mar. 19, 1912.
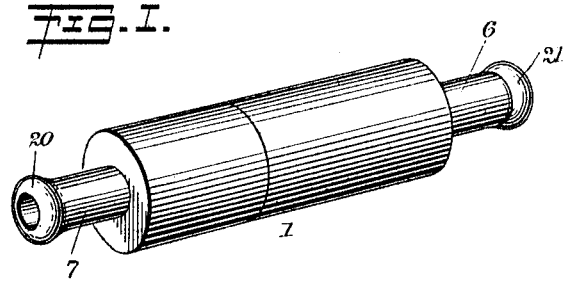
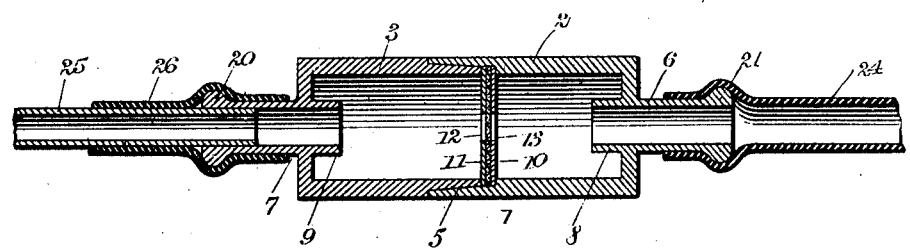
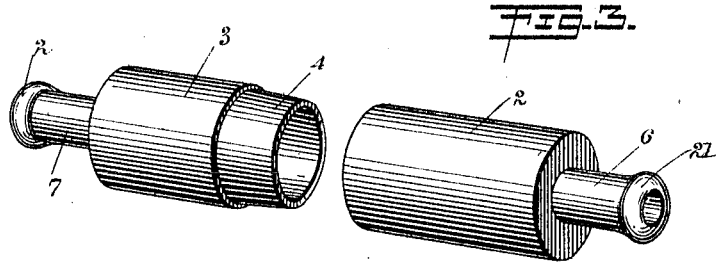
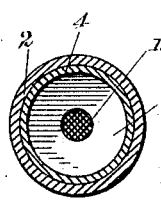
WITNESSES
G. Robert Thomas
L. J. Gallagher
INVENTOR
William J. Tinker
BY Munn & Co
ATTORNEYS

UNITED STATES PATENT OFFICE.

WILLIAM JOHNSTON TINKER, OF PIERCE CITY, MISSOURI.

GAS-FILTER.

1,020,782.  Specification of Letters Patent.  Patented Mar. 19, 1912.

Application filed April 15, 1911. Serial No. 621,266.

*To all whom it may concern:*

Be it known that I, WILLIAM J. TINKER, a citizen of the United States, and a resident of Pierce City, in the county of Lawrence and State of Missouri, have invented a new and Improved Gas-Filter, of which the following is a full, clear, and exact description.

My device relates generally to a filter and is particularly adapted for use in the gas supply pipe between the acetylene burner and the carbid tank in order to prevent the passage of water and dust into the burner, thereby choking it and causing the flame to go out.

The object of my invention is to provide a simple and effective device of this class which will consist of few parts and which may be easily placed in position between the carbid tank and gas burner on an automobile, the construction being such that it may be conveniently attached to rubber tubing.

Reference is to be had to the accompanying drawings forming a part of this specification in which like characters of reference denote corresponding parts in all the views and in which—

Figure 1 is a perspective view of my filter in operative position; Fig. 2 is a vertical sectional view thereof; Fig. 3 is a perspective showing the two parts of the cylinder in open position; Fig. 4 is a vertical sectional view thereof.

My filter is made up of a cylindrical member 1 composed of two parts 2 3, which are adapted to be placed in engagement with each other, as shown in Fig. 2, the part 3 having one end tapered as at 4, for this purpose, this tapered end engaging in a counter-bored tapered end portion 5 of the part 2. The opposite ends of the cylindrical member 1 are provided with integral tubular extensions 6, 7, each of these extensions projecting within the cylinder for a short distance 8, 9, whereby any dust or other foreign matter arrested in the cylinder may be allowed to deposit between the wall of the cylinder and the openings in the portions 6, 7, thereby insuring an uninterrupted flow of the gas therethrough. The filter when in position for use on the machine is subject to considerable vibration and motion as the machine travels over the ground and by providing the extensions 8, 9, within the cylinder I have provided a very simple and efficient means of preventing any foreign matter collected within the cylinder from finding its way back into the pipes leading thereto; the space within the cylinder between the side wall thereof and the sides of the extensions 8, 9, afford a very convenient pocket for retaining the foreign matter, it being immaterial in what position the filter is positioned since each extension projects well within the cylinder. In order to enable the portions 6, 7, to firmly engage in rubber tubing I have provided each of them with thickened ends 20, 21.

The filter proper is made up of two flat disks 10, 11, having a piece of gauze 12 between them, as shown in Fig. 2, each of the disks being provided with registering central apertures 12, 13. The diameter of the disks and the screen is substantially equal to the outer diameter of the end of the tapered portion 4 at the end of the member 3, this diameter being also equal to the inner diameter of the portion 2 at the bottom of the counter-bore 5, so that the disks with the gauze or screen between them may be easily dropped in place into the portion 2 and held in position by merely bringing the tapered end portion 3 into normal position in the counter-bored portion 5, as shown in Fig. 2, these parts frictionally engaging each other. By providing the apertures 12, 13, at a central portion of the disks 10, 11, I materially assist the prevention of foreign matter within the cylinder from finding its way into the pipes since by placing the apertures remote from the side walls of the cylinder a pocket is formed no matter in what position the cylinder is placed.

The normal position of the parts of my filter is as shown in Fig. 2; one extension 6 is brought into engagement with the tube 24 leading to the burner, and the other extension 7 is adapted to receive the end portion of the metal tube carried by the machine, a short piece of rubber tubing 26 serving to render the connection gas tight; when placed in the gas supply pipe and between the carbid generator and the burner, the gas will freely pass through the gauze or sieve but the water or carbid dust or other impurities will be held behind, the openings in the gauze being made very small in order to accomplish this end.

While my device is of exceedingly simple construction and of few parts, it will effectively perform the functions for which it was designed, and while I have shown it as of a single conformation it is obvious that various changes may be made within the spirit of the invention without departing from the appended claim.

Having thus described my invention, I claim as new, and desire to secure by Letters Patent:—

A device of the class described comprising a cylinder made up of two parts, one of the parts having one end thereof tapered and counter-bored, the end of the other of the said parts being tapered whereby it is adapted to enter the said counter-bored portion and be held frictionally in position therein, a projecting portion from opposite ends of the cylinder, each adapted to receive one end of a suitable piece of tubing, each of the said portions extending within the cylinder for a suitable distance, a screen and a plurality of disks having registering openings therein seated at the bottom of the said counter-bored portion and held in position transversely of the cylinder by reason of the engagement of the two parts thereof, the screen being positioned between the disks.

In testimony whereof I have signed my name to this specification in the presence of two subscribing witnesses.

WILLIAM JOHNSTON TINKER.

Witnesses:
R. W. BOUCHER,
THOS. H. GILMER.

---

Copies of this patent may be obtained for five cents each, by addressing the "Commissioner of Patents, Washington, D. C."